Patented Jan. 25, 1944

2,340,046

UNITED STATES PATENT OFFICE 2,340,046

CONDENSATION PRODUCT AND PROCESS OF MAKING THE SAME

Gaetano F. D'Alelio, Pittsfield, Mass., assignor to General Electric Company, a corporation of New York No Drawing. Application August 30, 1941, Serial No. 409,022

13 Claims. (Cl. 260—42)

This invention relates to condensation products derived from novel starting materials containing amino, amide, and imino linkages. More particularly, it is concerned with nitrogen containing resinous compositions comprising aldehyde condensation products of substituted or unsubstituted monocarbamido derivatives of monomethyl amines or substituted methyl amines represented by the general formula:

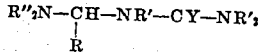

wherein Y represents oxygen or sulphur, R represents hydrogen or a monovalent aliphatic, carbocyclic or aromatic hydrocarbon radical of not more than six carbon atoms, at least one R' represents hydrogen and the other (R')s and R" represent either hydrogen or any monovalent hydrocarbon or halo-hydrocarbon radical, whether saturated or unsaturated, aliphatic, alicyclic, aromatic or heterocyclic, mono- or poly-nuclear, etc.

The class of organic compounds under consideration broadly designated as monocarbamido derivatives of an amino monomethyl amine (either substituted or unsubstituted) have been found to react with aldehydes or aldehyde-engendering agents to form resins varying from clear liquid products to vitreous or semi-vitreous solid products. These compounds have further been found to function as catalytic reactants in the preparation of resins depending on condensation reactions for their formation and as curing reactants for resins obtained by condensation reactions.

These novel preformed substituted amine compounds, reactable with aldehydes or agents engendering aldehydes, may suitably be prepared by reacting, in the cold, a concentrated aqueous solution of 1 mol of ammonia, a primary amine or a secondary amine with a concentrated aqueous solution of 1 mol of a suitable class of preformed compounds hereinafter referred to as monocarbinol-ureas, which term is intended to cover not only the simple mono-(N-carbinol) derivatives of urea, such as monomethylol urea, but also the monocarbinol derivatives or substituted monocarbinol derivatives of urea and thiourea, or substituted ureas and thioureas, represented by the formula:

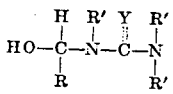

wherein, as previously indicated, Y represents oxygen or sulphur, R represents hydrogen or a monovalent aliphatic carbocyclic or aromatic hydrocarbon radical of not more than 6 carbon atoms, and at least one R' represents hydrogen and the other (R')s either hydrogen or any monovalent hydrocarbon radical, examples of which are aliphatic (e. g., methyl, ethyl, propyl, isopropyl, butyl, secondary butyl, isobutyl, butenyl, amyl, isoamyl, hexyl, allyl, etc.) including cycloaliphatic (e. g. cyclopentyl, cyclopentenyl, cyclohexyl, cyclohexenyl, cycloheptyl, etc.); aryl (e. g. phenyl, diphenyl, naphthyl, etc.); alkaryl (e. g. tolyl, xylyl, ethylphenyl, propylphenyl, isopropylphenyl, etc.); aralkyl (e. g. benzyl, phenylethyl, phenylpropyl, etc.); and their homologues, as well as those groups with one or more of their hydrogen atoms substituted by a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc.

Examples of such monocarbinol-urea compounds other than the previously-mentioned monomethylol urea are: monoethylol urea, monomethylol thiourea, monoethylol thiourea, monopropylol urea, monobutylol urea, monobutylol thiourea, monophenylcarbinol-urea (monobenzylol urea), monomethylol phenyl urea, monomethylol allyl urea, monomethylol phenyl thiourea, monomethylol diphenylurea, monomethylol ethyl phenyl urea, etc.

Examples of primary aliphatic, aromatic, alicyclic, etc. amines for the preparation of the monoureide derivatives are methyl amine, ethyl amine, propyl amine, isopropyl amine, cyclopentyl amine, cyclohexylmethylamine, cyclohexyl amine, aniline, toluidine, naphthyl amine, benzyl amine, phenylethyl amine, etc. Examples of various secondary amines are dimethyl amine, ethyl methyl amine, diethyl amine, ethyl isopropyl amine, dibutyl amine, methyl aniline (methyl phenyl amine) di-phenyl amine, ethyl benzyl amine, etc.

Preferably the novel compounds are prepared by slowly adding a cold concentrated solution of ammonia or a primary or secondary amine, i. e., a compound of the formula R"₂NH wherein R" represents R or any monovalent hydrocarbon radical, to the required amount of the cold concentrated aqueous solution of the desired monocarbinol-urea in the ratio of 1 mol ammonia or amine to 1 mol of the monocarbinol urea at a temperature between 0 and —20° centigrade. The mixture is held within this temperature range for the duration of the condensation reaction in which the ammonia or the designated amine reacts with the monocarbinolurea to form the monocarbamido derivative as follows:

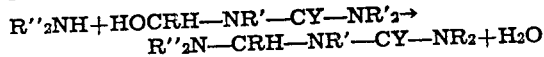

Thus 1 mol ammonia (R″=H) reacts with 1 mol monomethylol urea to form the simplest monocarbamidomethyl amine having the formula

The product of this reaction is recovered by evaporation of the water from the reaction mixture at room temperature or at temperatures below room temperature, either at atmospheric or sub-atmospheric pressure.

Alternatively, the crystalline products may be recovered by adding to the aqueous solution of the reaction product a suitable water-miscible precipitant therefor, which precipitant is incapable of reacting with the desired crystalline product.

I have discovered that the class of compounds represented by the formula

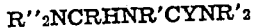

is a very versatile class of organic compounds.

The compound R″$_2$NCH$_2$NHCYNH$_2$ is more readily resinified by aldehydes than are the other compounds of the general formula

and the other subclasses and the approximate ease of resinification decreases progressively as the hydrogens are replaced by monovalent hydrocarbon radicals.

The novel compounds of this invention may be used as reactant catalysts in the preparation of synthetic resins, especially aminoplast resins, from aldehydes and other aldehyde reactable organic compounds, e. g., in the condensation of urea-formaldehyde, thiourea-formaldehyde, melamine-aldehyde, protein aldehyde, phenol-aldehyde, etc. By a reactant catalyst is meant a substance that will accelerate the condensation between an aldehyde and an aldehyde-reactable organic compound while it itself becomes part of the resin. In this connection, the related compounds having no active hydrogens, i. e., having the formula R″$_2$NCR$_2$NR′CYNR′$_2$ wherein R, R′ and R″ are all monovalent hydrocarbon radicals, cannot participate in aldehyde condensation processes, but are, however, valuable as plasticizers or as direct condensation catalysts, as distinguished from reactant catalysts, plasticizers, in the preparation of other resins, especially aminoplasts.

Being bases, the novel compounds of this invention and the related completely substituted compound mentioned above form salts with organic and inorganic acids such as hydrochloric, sulfuric, nitric, hydrofluoric, carbonic, formic, acetic, propionic, butyric, chloracetic, dichloracetic, benzoic, phthalic, cyclohexyl, carboxylic, oxalic, malonic, succinic, adipic, maleic, fumaric, citraconic, acrylic, methacrylic, atropic, polyacrylic, polymethacrylic acids, etc. These acids will form salts with the novel class of compounds of this invention before, during, or after reaction with aldehydes, alone or co-reacted with other modifying bodies, as will be hereinafter shown. These salts are valuable in accelerating the conversion of the resins obtained from the base compound R″$_2$NCRHNR′CYNR′$_2$ and aldehydes to the insoluble and infusible state. They likewise function in accelerating the conversion of other aminoplast resins such as urea-aldehyde resins, melamine-aldehyde resins, protein-aldehyde resins, etc., or as curing reactants therefor. A curing reactant is defined as a substance which causes the curing or accelerates the curing of a resin while it itself is a part of the resin or at some time becomes an integral part of the resin. Since these salts become part of the resin, the final resin strictly may be called an aminoplast resin.

The novel class of organic compounds of this invention may be mixed with resin intermediates containing carbinol (—CR$_2$OH) groups, such as monomethylol ureas, dimethylol ureas, phenol methylols, protein methylols, the methylols of cyclic amidines, e. g., melamine methylols, aminopyrimidine methylols, guanazole methylols, etc. and then co- or inter-resinified alone or in the presence of active methylene compounds or other modifying bodies.

Before, during, or after the resinification process, the reaction between the aldehyde or a mixture of aldehydes and the novel compounds of this invention may be modified by the presence of suitable amounts of a large class of compounds, for example hydroxy compounds, e. g., methyl, ethyl, propyl, isopropyl, butyl, amyl, tertiary amyl, benzyl, furfuryl, tetrahydrofurfuryl, cyclohexyl, phenethyl, naphthyl, polyvinyl, allyl, methallyl, crotyl, 1-chlorallyl, propargyl, 2-chlorallyl, cinnamyl alcohols, etc. glycol, diethylene glycol, triethylene glycol, polyethylene oxide, glycerine, pentaerythritol, saligenin, alkyd resin, phenol, cresol, xylenol, resorcinol, catechol, pyrogallol, naphthol, etc.; chlorohydrin, epichlorohydrin, nitrobutanol, diacetone, alcohol, ethylene oxide, propylene oxide, etc.; ammonia and its amino, amido, or imino compounds, e. g. methylamine, dimethylamine, hydroxylamine, hydrazine, phenyl hydrazine, diamylamine, stearyl amine, cyclohexyl amine, aniline, diphenylamine, diaminobenzene, triaminobenzene, aminophenol, nitro aniline, piperazine, ethanolamine, di-isopropanolamine, triethanolamine, propanolamine, ethylene diamine, formamide, acetamide, propionamide, lauramide, acrylic amide, methacrylic amide, atropic amide, malonic diamide, itaconic diamide, succinic diamide, citraconic triamide, benzamide, phthalic diamide, phthalimide, benzoyl sulfinimide, benzoyl sulfonylimide, aminobenzene sulfonylamide, benzene disulfonylamide, benzene trisulfonylamide, anthranilic esters, anthranilamide salicylamide, para phenyl benzene sulfonylamide, tolyl amide, etc.; the amino 1,3,5 triazines, e. g., 2,4,6 triamino 1,3,5-triazine, 2-amino-1,3,5-triazine, 2,4-diamino-1,3,5-triazine; the hexadiazines, e. g., 2,4,6 triaminopyrimidine, the diamino pyrimidine thio ethers; the amino-1,2,4-triazoles, e. g., guanazole, phenyl guanazole, dehydrazamido-1,2,4 pyrrodiazole, guanazo-guanazole, imidurazo-guanazole, the amino 1,2 diazoles, e. g., 3,5 diamino pyrazole; the urea type compounds, e. g., urea, methylurea, monomethylol urea, phenyl urea, thiourea, phenyl thiourea, unsymmetrical diphenyl urea, unsymmetrical ethyl phenyl urea, hydroxy urea, ethanol urea, unsymmetrical diethanol urea, guanidine, aminoguanidine, biguanidine, dicyandiamide, guanyl urea, guanyl thiourea; the proteins, e. g., casein, soya bean protein, alfalfa protein, gelatin, coffee bean protein; alkyd resins having free hydroxyl groups such as glyceryl phthalate, oil-modified glyceryl phthalate, diethylene glycol succinate, triethylene glycol maleate, glyceryl maleate, etc.; nitriles, e. g., acetonitrile, propionitrile, butyronitrile, benzonitrile, acrylonitrile, methacrylonitrile, atropic nitrile, ethylene cyanohydrin, acetone cyanohydrin, aminoisobutyronitrile, aminoacetonitrile, etc.; esters, sch as lactic esters, hydroxy isobutyric esters, acetoacetic esters, malonic esters, etc.

The highly substituted novel compounds of this invention may be used as plasticizers for many resins, especially aminoplast resins. In many cases they themselves become resinous during the plasticizing process, while in other cases they condense with the resinous intermediate during manufacturing operations. Specifically, these materials may be used (1) unconverted as plasticizers, (2) partly or completely converted as plasticizers, (3) partly or completely intercondensed to exert a plasticizing effect.

The final and intermediate resins and condensation products prepared from the novel materials of this invention alone or with the modification already expressed are extremely compatible with many other natural or synthetic resins in their intermediate or ultimate stages.

This novel class of compounds, when reacted with aldehydes, alone or with modifications, will form self-curing aminoplasts by condensation with curing reactants, such as chloracetonitrile, nitrourea, glycine, amino propanol hydrochloride, mono-, di- or tri-chloracetamides, alpha beta dibrompropionitrile, aminoacetamide hydrochloride, ethylene diamine monohydrochloride, sulfamic acid, chloracetyl urea, citric diamide, phenacyl chloride and others mentioned, for example, in my copending applications Serial No. 346,962, filed July 23, 1940, and Serial No. 354,395, filed August 27, 1940, both of which applications are assigned to the same assignee as the present invention.

The novel base materials of this invention may be used to peptize or swell proteins, shellac, acidic alkyd resins, etc., bringing them into solutions or dispersions or emulsions, or gels. Such compositions then may be "hardened" by the addition of aldehydes, preferably formaldehyde or compounds engendering formaldehyde, such as paraformaldehyde or hexamethylene tetramine.

The initial reaction leading to the formation of the new condensation products of ingredients comprising an aldehyde and a compound of the formula

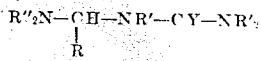

may be carried out at normal or at elevated temperatures, at atmospheric or superatmospheric pressures, and in the presence or absence of an acid or an alkaline condensing agent or catalyst. Preferably the reaction between the components is started under alkaline conditions.

Any substance yielding an alkaline aqueous solution may be used in obtaining alkaline conditions for the initial condensation reaction. For example, I may use an alkali such as sodium, potassium and calcium hydroxides, sodium and potassium carbonates, mono-, di- and triamines, etc. Best results are obtained by causing the condensation reaction between the primary components to take place in the presence of a primary condensation catalyst and a secondary condensation catalyst. To obtain condensation products having optimum time- or storage-stability characteristics I have found that the primary catalyst should be a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl, etc.) amines, etc., and (2) nitrogen-containing basic compounds that are aldehyde-reactable, for instance ammonia, primary amines, (e. g., ethyl amine, propyl amine, etc.) and secondary amines (e. g., dipropyl amine, dibutyl amine, etc.). The secondary condensation catalyst, which ordinarily is used in an amount less than the amount of primary catalyst, should be a fixed alkali, for instance a carbonate, cyanide or hydroxide of an alkali metal (e. g., sodium, potassium, lithium, etc.).

Various ways may be employed for effecting initial reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively, I may first condense either my monoureide derivative or some other aldehyde reactable material such as a urea, a phenol, a melamine, or the like with a suitable aldehyde and thereafter, at any stage of the original reaction, I may add the remaining aldehyde-reactable ingredient or ingredients. Or, I may condense or partially condense the monoureide derivative with an aldehyde, add the resulting product to a urea-aldehyde, a phenol-aldehyde, or some other partial condensation product of an aldehyde and an aldehyde reactable body and then cause the reaction to proceed further. Still other ways may be employed in combining the components in producing the modified or unmodified products of this invention, as will readily be understood by those skilled in the art from the following examples illustrating how the principles of this invention are carried into effect.

*Example 1*

An aqueous solution of the compound

prepared in the manner set forth hereinbefore, was treated with various amounts of N/3 hydrochloric acid to produce solutions of

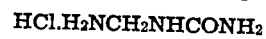

alone or in acid solution and mixtures of H₂NCH₂NHCONH₂ and HCl.H₂NCH₂NHCONH₂. The evaporation of the water from these mixtures produced clear, colorless salts. These salts or solutions thereof are useful as reacting catalysts or curing reactants in the preparation of resinous condensation products, as will be shown more fully hereinafter. When treated with proportionate quantities of an aldehyde, preferably formaldehyde, on a hot plate at 140° C. these salts (or mixtures thereof) yielded self-curing resins.

*Example 2*

The white crystalline product

was treated with aqueous formaldehyde on the hot plate at 140° C. and gave a clear colorless resin that bodied to the thermoplastic stage. The addition of curing reactants, e. g., chloracetamide, glycine, etc., or acids, e. g., citric, sulfamic, etc., to the thermoplastic mass caused hard infusible resins to be produced.

Example 3

| | Parts by weight |
|---|---|
| Aqueous $H_2NCH_2NHCONH_2$ (45% conc.) | 25.7 |
| Aqueous formaldehyde (approx. 37.1% $CH_2O$) | 9.7 |

The above components were mixed and refluxed for 15 minutes to produce a clear, colorless syrup. When treated with less than one per cent by weight of various agents, i. e., chloroacetamide, glycine, citric acid, etc. on the hot plate at 140° C. hard, infusible resins were the product.

Twenty-three parts of the above syrup were mixed with 0.1 part chloracetamide and refluxed for 10 minutes. Then 7 parts alpha flock and 0.04 part zinc stearate were added and the compound dried at 70° C. The resulting molding compound was molded at 130° C., and 2000#/sq. in. for 5 minutes to produce a well-cured molded piece.

Example 4

| | Parts by weight |
|---|---|
| Aqueous $H_2NCH_2NHCONH_2$ (45% conc.) | 12.9 |
| Furfural | 5.7 |
| NaOH in 0.5 part water | 0.005 |

The above components were heated together under reflux for 15 minutes to yield a low viscosity syrup. On the hot plate at 140° C., this syrup bodied slowly to a thermoplastic resin. The addition of small amounts of acids or curing reactants produced self-curing resins of commendable toughness.

Example 5

| | Parts by weight |
|---|---|
| Aqueous $H_2NCH_2NHCONH_2$ (45% conc.) | 12.9 |
| Acrolein | 6.7 |
| NaOH in 0.5 part water | 0.01 |

These materials were mixed and refluxed for 15 minutes to produce a syrup having a pH of 10.35. Treatment thereof with suitable agents such as those mentioned in Example 3 on the hot plate at 140° C., gave heat-hardenable tough resins.

Example 6

| | Parts by weight |
|---|---|
| Aqueous $H_2NCH_2NHCONH_2$ (45% conc.) | 16.2 |
| Urea | 3.0 |
| Aqueous formaldehyde (approx. 37.1% $CH_2O$) | 10.0 |

These components were refluxed together for 30 minutes to yield a clear syrup which, treated on the hot plate at 140° C., bodied to a clear thermoplastic resin. Conversion to a thermosetting resin was accomplished by the inclusion of any one of a number of the previously enumerated agents. Twenty-three parts of the resin syrup were converted into a molding compound by mixing therewith 0.1 part chloracetamide, refluxing for 10 minutes to allow intercondensation and then adding 7 parts alpha flock and 0.04 part zinc stearate. The compound was dried at 70° C. and molded at 130° C. at 2000#/sq. in. pressure to yield a molded piece with a good cure and gloss.

Example 7

| | Parts by weight |
|---|---|
| Aqueous $H_2NCH_2NHCONH_2$ (45% conc.) | 16.2 |
| Thiourea | 3.8 |
| Aqueous formaldehyde (approx. 37.1% $CH_2O$) | 10.0 |

The above components were mixed and refluxed for 30 minutes. With curing reactants or agents, e. g., chloracetamide, blycine, citric acid, etc., a heat-convertible resin that cured rapidly at 140° C. was obtained.

With 25 parts of this syrup 0.1 part chloracetamide was intercondensed by reflux followed by the addition of 7 parts alpha flock and 0.04 part zinc stearate. The resultant compound was dried at 70° C. A piece molded from the dry compound at 130° C. exhibited good cure and gloss and very good water resistance.

Example 8

| | Parts by weight |
|---|---|
| Aqueous $H_2NCH_2NHCONH_2$ (45% conc.) | 4.8 |
| Para toluene sulfonamide | 8.6 |
| Aqueous formaldehyde (approx. 37.1% $CH_2O$) | 10.0 |

These reactants were heated together under reflux for 15 minutes. There was produced a resin convertable to an infusible state by treatment on the hot plate at 140° C. with acids or curing reactants. The cured resin was clear and colorless and, when dissolved in a suitable solvent and used as a varnish, produced transparent tough films. The resin was soluble in Solvatone.

Example 9

| | Parts by weight |
|---|---|
| Aqueous $H_2NCH_2NHCONH_2$ (45% conc.) | 2.4 |
| Aqueous formaldehyde (approx. 37.1% $CH_2O$) | 12.0 |
| Melamine | 6.3 |

Refluxing of the mixture of the above materials for 15 minutes yielded a clear syrup a sample of which cured slowly to a hard resin when treated on the hot plate at 140° C. The addition of acids and curing reactants greatly accelerated this cure.

A molding compound was prepared by adding to the above syrup 0.1 part chloracetamide followed by heating under reflux for 5 minutes. Six parts alpha flock and 0.04 part zinc stearate were then added and the compound dried at 70° C. to give a very well cured piece of pleasing color.

Example 10

| | Parts by weight |
|---|---|
| Aqueous $H_2NCH_2NHCONH_2$ (45% conc.) | 6.27 |
| Aqueous formaldehyde (approx. 37.1% $CH_2O$) | 19.5 |
| Phenol, synthetic | 9.0 |

These ingredients were heated together under reflux for 50 minutes and the resulting syrup acidified by the addition of 0.48 part oxalic acid in 5 parts water. The further addition of 11 parts alpha flock and 0.1 part zinc stearate gave a compound which after being dried at 70° C. could be molded at 130° C. to produce a piece with a good cure and light color.

Example 11

| | Parts by weight |
|---|---|
| Aqueous $H_2NCH_2NHCONH_2$ (45% conc.) | 4.6 |
| Dimethylol urea (11% $H_2$) | 25.8 |

The above components were mixed with 20 parts water and heated under reflux for 30 minutes. The resulting clear syrup was converted to a resin which was self-curing on the hot plate at 140° C. by the addition of the usual acids and curing reactants.

A portion of the above syrup was used to prepare a molding compound as follows:

| | Parts by weight |
|---|---|
| Above resin syrup | 23.0 |
| Chloracetamide | 0.1 |

These two materials were heated together under reflux for 10 minutes and seven parts alpha flock and 0.04 part zinc stearate were added to the reaction product, the compound was dried at 70° C. and molded at 130° C. to form a well-cured piece.

*Example 12*

|  | Parts by weight |
|---|---|
| Aqueous $H_2NCH_2NHCONH_2$ (45% conc.) | 12.9 |
| Aqueous formaldehyde (approx. 37.1% $CH_2O$) | 4.8 |
| Butyl alcohol | 7.4 |

The above components were mixed and heated under reflux for 1 hour. There was obtained a water-white syrup that bodied on the hot plate at 140° C. to a transparent thermoplastic resin. The addition of acids or curing reactants served to convert the resin to a tough, infusible state. The resin was used as a varnish. Oven-baked at reasonably low temperatures resulted in the formation of hard transparent films.

*Example 13*

|  | Parts by weight |
|---|---|
| Aqueous $H_2NCH_2NHCONH_2$ (45% conc.) | 12.9 |
| Aqueous formaldehyde (approx. 37.1% $CH_2O$) | 6.4 |
| Diethyl malonate | 1.6 |

The above components were heated together under reflux for 1 hour to produce a clear colorless syrup which when treated with small amounts of acids or curing reactants cured on the hot plate at 140° C. to a tough infusible resin. The syrup may be concentrated by the evaporation of water to yield a very viscous resin that is alcohol-soluble.

*Example 14*

|  | Parts by weight |
|---|---|
| Aqueous $H_2NCH_2NHCONH_2$ (45% conc.) | 12.9 |
| Aqueous formaldehyde (approx. 37.1% $CH_2O$) | 4.8 |
| Acetamide | 0.6 |

These components were mixed and heated under reflux for 1 hour. The clear syrup produced a cured resin when small amounts of acids or curing reactants were added thereto and the mixture heated to 140° C. to evaporate the water present.

*Example 15*

|  | Parts by weight |
|---|---|
| Aqueous $H_2NCH_2NHCONH_2$ (45% conc.) | 12.9 |
| Aqueous formaldehyde (approx. 37.1% $CH_2O$) | 4.8 |
| Glycerine | 1.9 |

The above components were mixed and heated under reflux for 30 minutes. A sample of the clear syrup bodied slowly to a thermoplastic resin when tested on the hot plate at 140° C. The inclusion of acids or curing reactants produced a tough hard resin on heating. This resin may be used as a plasticizer for other aminoplasts.

*Example 16*

|  | Parts by weight |
|---|---|
| Aqueous $H_2NCH_2NHCONH_2$ (45% conc.) | 12.9 |
| Aqueous formaldehyde (approx. 37.1% $CH_2O$) | 4.8 |
| Polyvinyl alcohol | 5.8 |

The above ingredients were mixed and 25 parts water added, then heated under reflux for 30 minutes. A very viscous clear syrup with a pH of 7.04 was produced. A sample thereof tested on the hot plate at 140° C. formed a clear colorless thermoplast. By lowering the pH of the syrup by the addition of acids the resin was converted to a hard infusible state on heating. Films thereof baked at 55° C.–60° C. for 15 hours were rather hard, but tough and pliable.

*Example 17*

|  | Parts by weight |
|---|---|
| Alkyd resin (glyceryl phthalate) | 50.0 |
| $H_2NCH_2NHCONH_2$ | 2.0 |
| Paraform | 3.0 | were dry mixed and then fluxed togethed at 140° C. to form a hard infusible transparent mass. The resin mass was tough and may be used for binding, etc.

*Example 18*

Example 17 was repeated using shellac in place of the alkyd resin. The shellac became a self-curing resin in that a tough infusible product was obtained. As this resin is a good water-repellent adhesive, it too may be used as a mica binder, etc.

*Example 19*

A phenol aldehyde varnish was compounded as follows:

|  | Parts by weight |
|---|---|
| Phenol—82% (12% ortho) | 180.00 |
| Aqueous formaldehyde (37.1%) | 216.00 |
| $Na_2CO_3$ in 4.15 parts water | 1.8 |

These materials were mixed and heated under reflux for 30 minutes to produce a resin syrup having a pH of 8.8 and a hot plate cure at 150° C. of 85 seconds. The solids content of the syrup was 53%.

The clear colorless syrup of Example 3 was mixed with this phenol-aldehyde varnish in such proportions that the ratio of components on a "solids" basis was 1:9. The resultant mixture was tested for cure on the hot plate at 150° C. It was found that the curing time of the phenol-aldehyde varnish had been shortened by the addition of the $H_2NCH_2NHCONH_2$ aldehyde reaction product. The same clear syrup of Example 3 was mixed with the phenol-aldehyde varnish in such proportions that the solids ratio was 9:1. When this mixture was tested on the hot plate at 140° C. a hard infusible light-colored resin was obtained.

*Example 20*

Example 19 was repeated using instead of the phenol-aldehyde varnish a substantially anhydrous liquid phenol-aldehyde resin freed from catalyzing bases and salts. The results were the same as those obtained in Example 19; namely, the curing time at 160° C. of the catalyst-free phenol-aldehyde resin was lowered by the presence of the $H_2NCH_2NHCONH_2$ formaldehyde compound and the phenol-aldehyde resin served as a curing agent for $H_2NCH_2NHCONH_2$ aldehyde resins.

*Example 21*

A urea varnish was prepared by mixing

|  | Parts by weight |
|---|---|
| Urea | 60.00 |
| Aqueous formaldehyde (37.1%) | 161.00 |
| Aqueous $NH_3$ (28%) | 6.00 |
| NaOH in 5 parts water | 0.1 | and heating the mixture under reflux for 30 minutes. The resulting syrup was clear and had a solids content of 45%.

To 23 parts of this urea varnish were added 2.0 parts of a 45% solution of $$HCl \cdot H_2NCH_2NHCONH_2$$

This syrup now yielded a self-curing resin when tested on a hot plate at 140° C. It may be used in preparing molding compounds, no other added agent being necessary to obtain satisfactory curing thereof.

*Example 22*

The $H_2NCH_2NHCONH_2-CH_2O$ resin syrup of Example 19 was used as follows:

| | Parts by weight |
|---|---|
| Syrup of Example 19 | 15 |
| Aqueous trimethylol melamine (50%) | 15 | were heated together under reflux for 15 minutes. A sample of the resulting clear syrup product cured of its own accord when tested on the hot plate at 140° C. although acids, curing reactants, etc. materially accelerate this cure.

*Example 23*

Self-curing aminoplasts were also obtained by condensing $H_2NCH_2NHCONH_2$ with formaldehyde and then intercondensing the products with each of the following reactants: chloracetamide, glycine, nitrourea, chloral urea, alpha-beta-dibromopropionitrile, chloracetonitrile, trichloracetamide, polysalicyclic acid amide, citric acid diamide, phenacyl chloride and sulfamic acid diamide. All of the intercondensation products were self-curing resins. Numerous other intercondensing agents of the above types that might be used successfully will be obvious to those skilled in the art.

*Example 24*

| | Parts by weight |
|---|---|
| $(C_2H_5)_2NCH_2NHCONH_2$ in 15 parts water | 14.5 |
| Aqueous formaldehyde (approx. 37.1% $CH_2O$) | 16.1 |

The monocarbamidomethyl diethyl amine, obtained by reacting 1 mol monomethylol urea with 1 mol diethyl amine under the conditions previously described for the preparation of my novel starting materials, was mixed with the formaldehyde and heated under reflux for 45 minutes to yield a clear syrup. Samples of this syrup tested on the hot-plate at 140° C. were found to cure to infusible hard resins upon the addition of intercondensing reactants such as chloroacetamide, phenacyl chloride chloracetonitrile, malonic acid monoamide, trichloracetamide, etc.

To 20 parts of the syrup was added 0.2 part malonic acid monoamide and the mixture refluxed for 30 minutes. The product was self-curing at 140° C. Thin films of the resin product baked at 70° C. to 80° C. for 3–4 hours were hard and transparent.

*Example 25*

| | Parts by weight |
|---|---|
| $CH_3NHCH_2NHCONH_2$ in 15 parts water | 10.3 |
| Aqueous formaldehyde (approx. 37.1% $CH_2O$) | 16.2 |

The monocarbamidomethyl monomethyl amine which was prepared in the prescribed manner from 1 mol monocarbinol urea and 1 mol monomethyl amine, was mixed with the formaldehyde and the mixture refluxed for 45 minutes. The resulting clear syrup bodied at 130° C. to a clear thermoplastic mass that could be converted to a heat-hardenable mass by the addition of various curing agents.

Twenty parts of the clear syrup were mixed with 0.2 part malonic acid monoamide and heated under reflux for 30 minutes. Five parts alpha flock and 0.02 part zinc stearate were added. The compound so prepared was dried at 70° C. and molded at 130° C. at 2000 pounds per square inch pressure for 7 minutes. The molded piece, as extracted hot, exhibited a good cure.

In producing any of these new condensation products, the choice of the aldehyde component is dependent largely upon economic considerations and the particular properties desired in the finished product. I prefer to use as the aldehyde reactant formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, benzaldehyde, fufural, etc., mixtures thereof, or mixtures of formaldehyde (or compounds engendering formaldehyde) with such aldehydes. Various aldehyde-addition products may be used instead of aldehydes. Such products include the mono- and poly-(N-carbinol) derivatives, more particularly the mono- and poly-methylol derivatives, of urea, thiourea, selenourea, and iminourea, substituted ureas, thioureas, selenoureas, and iminoureas, derivatives of amides of poly-carboxylic acids, e. g., maleic, itaconic, fumaric, adipic, malonic, citric, phthalic, etc. I may also, with particularly good results, use the methylol melamines, e. g., mono-, di-, tri-, tetra-, penta-, and hexa-methylol melamines. Mixtures of these materials or mixtures of an aldehyde with such materials may also be used.

The ratio of aldehydic reactant to the monoureide derivatives may be varied over a wide range but ordinarily is of the order corresponding to at least one mol of the aldehyde, or an equivalent amount of an aldehyde engendering or addition products, for each mol of the diureide derivative. Thus, I may use, for example, from one to five or six mols, preferably 3 mols, of an aldehyde for each mol of the monoureide derivative.

Dyes, pigments, plasticizers, mold lubricants, opacifiers, and various fillers (e. g., wood flour, glass fibers, asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used, as has been shown, as modifiers of other natural and synthetic resins, as laminating varnishes in the production of laminated articles wherein sheet materials, e. g., paper, cloth, sheet asbestos, etc. are coated and impregnated with the resin, superimposed and thereafter united under heat and pressure. They may also be used as modifiers of, or may be modified by, the synthetic compositions disclosed in various copending applications of mine, for example in co-pending applications Serial Numbers 409,017; 409,018; 409,019; 409,020; 409,021; filed concurrently herewith and assigned to the same assignee as the present invention. More specifically, the compositions of this invention may be used in the form of mixtures with condensation products of preformed substituted or unsubstituted di-, or tri-(carbamidomethyl) amines and aldehydes, or condensation products of substituted or unsubstituted mono-, di-, or tri-(monocarbinolureidomethyl) amines, or with two or more of such condensation products. They may be used in the production of wire or baking enamels, for bonding or cementing together mica flakes to form a laminated mica article, for bonding together abrasive grains in the production of resin-bonded abrasive articles, such for instance as grindstones, sandpapers, etc. in the manufacture of electrical resistors, etc. They also may be employed for treating cotton, linen, and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and an organic compound corresponding to the formula

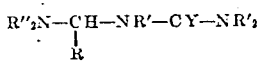

where Y represents a member of the class consisting of oxygen and sulphur, R represents a member of the class consisting of hydrogen and a monovalent hydrocarbon radical of not more than six carbon atoms, R' represents a member of the class consisting of hydrogen and monovalent hydrocarbon and halogeno-hydrocarbon radicals, at least one R' representing hydrogen, and one R" represents a hydrocarbon radical and the other represents a member of the class consisting of hydrogen and monovalent hydrocarbon and halogeno-hydrocarbon radicals.

2. A composition comprising a condensation product of ingredients comprising an aldehyde and an amine corresponding to the general formula

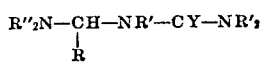

where Y is a member of the class consisting of oxygen and sulphur, R and R' represent hydrogen, and R" is a monovalent hydrocarbon radical.

3. A composition comprising a condensation product of ingredients comprising an aldehyde and an amine corresponding to the general formula

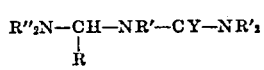

where Y represents oxygen and R, R' represent hydrogen and one R" represents a hydrocarbon radical and the other represents a member of the class consisting of hydrogen and monovalent hydrocarbon and halogeno-hydrocarbon radicals.

4. A composition comprising a condensation product of ingredients comprising formaldehyde and an amine corresponding to the general formula

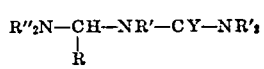

where Y represents oxygen and R, R' represent hydrogen and one R" represents a hydrocarbon radical and the other represents a member of the class consisting of hydrogen and monovalent hydrocarbon and halogeno-hydrocarbon radicals.

5. A composition as in claim 1 wherein the reaction product is an alcohol-modified product of the stated components.

6. A composition comprising the product of reaction of ingredients comprising urea, an aldehyde, and a monocarbamido derivative of a triamine having the formula

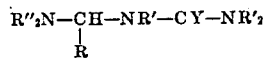

where Y is a member of the class consisting of oxygen and sulphur, R is a member of the class consisting of hydrogen and monovalent hydrocarbon radicals of not more than six carbon atoms, R' represents a member of the class consisting of hydrogen and monovalent hydrocarbon and halogeno-hydrocarbon radicals, at least one R' representing hydrogen, and R" represents a hydrocarbon radical.

7. A composition comprising the product of reaction of melamine, a monocarbamido derivative of a triamine having the formula

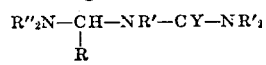

where Y is a member of the class consisting of oxygen and sulphur, R is a member of the class consisting of hydrogen and monovalent hydrocarbon radicals of not more than six carbon atoms, at least one R is hydrogen and the other (R')s are members of the class consisting of hydrogen and monovalent hydrocarbon and halogeno-hydrocarbon radicals, and R" represents a hydrocarbon radical, and formaldehyde.

8. A heat-curable composition comprising the heat-convertible product of reaction of (1) a partial condensation product of ingredients comprising urea, an aldehyde and an amine derivative of the general formula

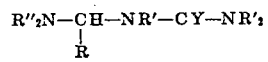

where Y is a member of the class consisting of oxygen and sulphur, R is a member of the class consisting of hydrogen and a monovalent hydrocarbon radical of not more than six carbon atoms, R' represents a member of the class consisting of hydrogen and monovalent hydrocarbon and halogeno-hydrocarbon radicals, at least one R' representing hydrogen, and R" represents a monovalent hydrocarbon radical, and (2) a chlorinated acetamide.

9. A product comprising the heat-cured composition of claim 8.

10. A composition comprising the product of reaction of formaldehyde, polyvinyl alcohol, and an amine derivative corresponding to the formula

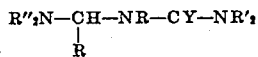

where Y is a member of the class consisting of oxygen and sulphur, R is a member of the class consisting of hydrogen and a monovalent hydrocarbon radical of not more than six carbon atoms, and R' represents a member of the class consisting of hydrogen and monovalent hydrocarbon and halogeno-hydrocarbon radicals, at least one R' representing hydrogen, and R" represents a hydrocarbon radical.

11. A resinous composition comprising the product of reaction of ingredients comprising furfural and an amine derivative corresponding to the formula

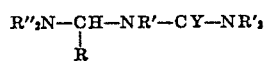

where Y is a member of the class consisting of oxygen and sulphur, R is a member of the class consisting of hydrogen and a monovalent hydrocarbon radical of not more than six carbon atoms, and R' represents a member of the class consisting of hydrogen and monovalent hydrocarbon and halogeno-hydrocarbon radicals, at least one R' representing hydrogen, and R'' represents a hydrocarbon radical.

12. The method of preparing new condensation products which comprises effecting reaction between ingredients comprising an aldehyde and an amide corresponding to the formula

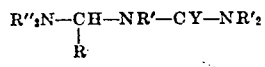

where Y is a member of the class consisting of oxygen and sulphur, R is a member of the class consisting of hydrogen and a monovalent hydrocarbon radical of not more than six carbon atoms, and R' represents a member of the class consisting of hydrogen and monovalent hydrocarbon and halogeno-hydrocarbon radicals, at least one R' representing hydrogen, and R'' represents a hydrocarbon radical.

13. A resinous composition comprising the product of reaction of melamine and an aldehyde and an amine having the general formula

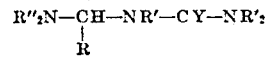

where Y is a member of the class consisting of oxygen and sulphur, R is a member of the class consisting of hydrogen and a monovalent hydrocarbon radical of not more than six carbon atoms, R' represents a member of the class consisting of hydrogen and monovalent hydrocarbon and halogeno-hydrocarbon radicals, at least one R' representing hydrogen, and R'' represents a hydrocarbon radical.

GAETANO F. D'ALELIO.

CERTIFICATE OF CORRECTION.

Patent No. 2,340,046. January 25, 1944.

GAETANO F. D'ALELIO.

It is hereby certified that error appears in the printed specification of the above numbered patent requiring correction as follows: Page 1, second column, line 49, for "R" read --H--; page 3, first column, line 7, for "sch" read --such--; page 4, first column, line 9, for "chloroacetamide" read --chloracetamide--; line 75, for "blycine" read --glycine--; page 5, second column, line 13, for "togethed" read --together--; page 6, first column, line 33, for "polysalicyclic" read --polysalicylic--; page 7, second column, line 24, for "R" read --R'--; and that the said Letters Patent should be read with this correction therein that the same may conform to the record of the case in the Patent Office.

Signed and sealed this 25th day of April, A. D. 1944.

(Seal)

Leslie Frazer

Acting Commissioner of Patents.